(12) United States Patent
Ma et al.

(10) Patent No.: US 11,803,996 B2
(45) Date of Patent: Oct. 31, 2023

(54) NEURAL NETWORK ARCHITECTURE FOR FACE TRACKING

(71) Applicant: Lemon Inc., Grand Cayman (KY)

(72) Inventors: Wanchun Ma, Los Angeles, CA (US); Shuo Cheng, Los Angeles, CA (US); Chao Wang, Los Angeles, CA (US); Michael Leong Hou Tay, Los Angeles, CA (US); Linjie Luo, Los Angeles, CA (US)

(73) Assignee: LEMON INC., Grand Cayman (KY)

( * ) Notice: Subject to any disclaimer, the term of this patent is extended or adjusted under 35 U.S.C. 154(b) by 43 days.

(21) Appl. No.: 17/390,440

(22) Filed: Jul. 30, 2021

(65) Prior Publication Data
US 2023/0036903 A1 Feb. 2, 2023

(51) Int. Cl.
*G06T 13/40* (2011.01)
*G06N 3/08* (2023.01)
*G06V 40/16* (2022.01)

(52) U.S. Cl.
CPC ............ *G06T 13/40* (2013.01); *G06N 3/08* (2013.01); *G06V 40/162* (2022.01); *G06V 40/171* (2022.01); *G06V 40/176* (2022.01)

(58) Field of Classification Search
CPC .......... G06T 13/40; G06T 2207/20081; G06T 2207/20084; G06V 40/171; G06V 40/162; G06V 40/176; G06N 3/08
See application file for complete search history.

(56) References Cited

U.S. PATENT DOCUMENTS

| 10,679,041 | B2 * | 6/2020 | Cyrus ................. G06V 40/171 |
| 2010/0013832 | A1 * | 1/2010 | Xiao .................... G06V 40/171 345/420 |
| 2019/0279009 | A1 | 9/2019 | Srirangam Narashiman et al. |
| 2022/0222466 | A1 * | 7/2022 | Hassani ................. G06V 10/82 |
| 2022/0269879 | A1 * | 8/2022 | Liu ....................... G06V 10/806 |

FOREIGN PATENT DOCUMENTS

| CN | 112418074 A | 2/2021 |
| CN | 112800937 A | 5/2021 |
| CN | 113052132 A | 6/2021 |
| KR | 2019-0130179 A | 11/2019 |
| WO | WO 2020/150692 A1 | 7/2020 |

OTHER PUBLICATIONS

International Patent Application No. PCT/SG2022/050345; Int'l Written Opinion and Search Report; dated Jan. 6, 2023; 8 pages.

* cited by examiner

*Primary Examiner* — Antonio A Caschera
(74) *Attorney, Agent, or Firm* — BakerHostetler

(57) ABSTRACT

Techniques for face tracking comprise receiving landmark data associated with a plurality of images indicative of at least one facial part. Representative images corresponding to the plurality of images may be generated based on the landmark data. Each representative image may depict a plurality of segments, and each segment may correspond to a region of the at least one facial part. The plurality of images and corresponding representative images may be input into a neural network to train the neural network to predict a feature associated with a subsequently received image comprising a face. An animation associated with a facial expression may be controlled based on output from the trained neural network.

19 Claims, 10 Drawing Sheets

NEURAL NETWORK ARCHITECTURE FOR FACE TRACKING

BACKGROUND

Image recognition represents a set of methods for detecting and analyzing images to enable the automation of a specific task. Image recognition is a technology capable of identifying places, people, objects, and many other types of elements within an image and drawing conclusions from them by analyzing them. Improvements in image recognition techniques are desirable.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION OF ILLUSTRATIVE EMBODIMENTS

Face tracking is a technique for locating and tracking faces in images and videos. Face tracking is useful for a variety of different applications. For example, face tracking makes it possible to follow a particular face as it moves within a video stream, count the number of people in a video frame or live video stream, determine the direction in which a face is looking, and/or to recognize facial expressions and perform sentiment analysis. Accordingly, improvements in face tracking techniques are desirable.

Many recent face tracking techniques make use of two-dimensional facial landmark detection. Facial landmark detection is the task of detecting key landmarks on the face and tracking them. Facial landmark detection may be used to infer rigid and non-rigid facial deformations due to head movements and facial expressions. Most of the face tracking techniques that utilize facial landmark detection employ an energy minimization. The energy minimization takes the two-dimensional facial landmarks as input and optimizes for the identity and expression parameters of a morphable model in order to estimate the face shape and expression activation.

However, the landmark data does not naturally work with neural networks, such as convolutional neural networks. As a result, a neural network may not be able to predict face shape and/or expression activation using two-dimensional facial landmarks. Accordingly, it may be desirable to determine a way to utilize traditional two-dimensional facial landmark data in conjunction with a neural network to predict face shape and/or using two-dimensional facial landmarks. By transforming two-dimensional facial landmark data associated with an image of a face into an image-based representation of the landmark data and inputting the image-based representation into a neural network to train the neural network, the neural network may effectively be able to utilize two-dimensional facial landmark data to perform face tracking and expression recognition. As a result, the quality of face tracking and expression recognition may be improved.

Figure 1:
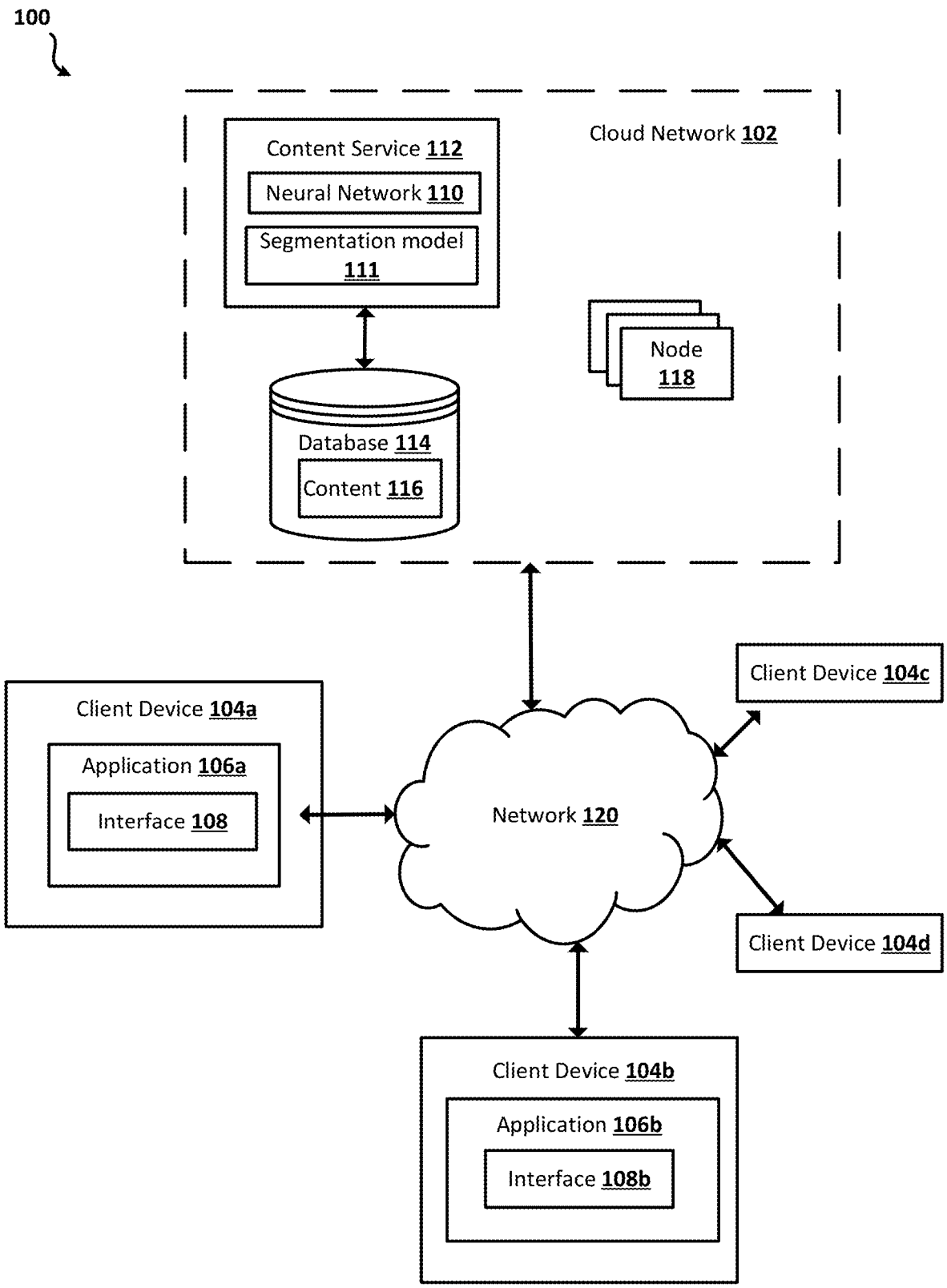
FIG. 1 shows an example system for distributing content.

A neural network for performing face tracking and expression recognition may be utilized by a variety of different systems or entities. For example, a content distributor may utilize a neural network for face tracking and expression recognition. FIG. 1 illustrates an example system 100 for distributing content. The system 100 may comprise a cloud network 102 and a plurality of client devices 104a-d. The cloud network 102 and the plurality of client devices 104a-d may communicate with each other via one or more networks 120.

The cloud network 102 may be located at a data center, such as a single premise, or be distributed throughout different geographic locations (e.g., at several premises). The cloud network 102 may provide the services via the one or more networks 120. The network 120 comprise a variety of network devices, such as routers, switches, multiplexers, hubs, modems, bridges, repeaters, firewalls, proxy devices, and/or the like. The network 120 may comprise physical links, such as coaxial cable links, twisted pair cable links, fiber optic links, a combination thereof, and/or the like. The network 120 may comprise wireless links, such as cellular links, satellite links, Wi-Fi links and/or the like.

The cloud network 102 may comprise a plurality of computing nodes 118 that host a variety of services. In an embodiment, the nodes 118 host a content service 112. The content service 112 may comprise a content streaming service, such as an Internet protocol video streaming service. The content service 112 may be configured to distribute content 116 via a variety of transmission techniques. The content service 112 is configured to provide the content 116, such as video, audio, textual data, a combination thereof, and/or the like. The content 116 may comprise content streams (e.g., video stream, audio stream, information stream), content files (e.g., video file, audio file, text file), and/or other data. The content 116 may be stored in a database 114. For example, the content service 112 may comprise a video sharing service, a video hosting platform, a content distribution platform, a collaborative gaming platform, and/or the like.

In an embodiment, the content 116 distributed or provided by the content service 112 comprises short videos. The short videos may have a duration less than or equal to a predetermined time limit, such as one minute, five minutes, or other predetermined minutes. By way of example and without limitation, the short videos may comprise at least one, but no more than four, 15 second segments strung together. The short duration of the videos may provide viewers with quick bursts of entertainment that allow users to watch a large quantity of videos in a short time frame. Such quick bursts of entertainment may be popular on social media platforms.

In an embodiment, the content 116 may be output to different client devices 104 via the network 120. The content 116 may be streamed to the client devices 104. The content stream may be a stream of short videos received from the content service 112. The plurality of client devices 104 may be configured to access the content 116 from the content service 112. In an embodiment, a client device 104 may comprise a content application 106. The content application 106 outputs (e.g., display, render, present) the content 116 to a user associated with the client device 104. The content may comprise videos, audio, comments, textual data and/or the like.

The plurality of client devices 104 may comprise any type of computing device, such as a mobile device, a tablet device, laptop, a desktop computer, a smart television or other smart device (e.g., smart watch, smart speaker, smart glasses, smart helmet), a gaming device, a set top box, digital streaming device, robot, and/or the like. The plurality of client devices 104 may be associated with one or more users. A single user may use one or more of the plurality of client devices 104 to access the cloud network 102. The plurality of client devices 104 may travel to a variety of locations and use different networks to access the cloud network 102.

In an embodiment, a user may use the content application 106 on a client device 104 to create content and upload the short video to the cloud network 102. The client devices 104 may access an interface 108 of the content application 106. The interface 108 may comprise an input element. For example, the input element may be configured to allow users to create the content. To create the content, the user may give the content application 106 permission to access an image capture device, such as a camera, or a microphone of the client device 104. After the user has created the content, the user may use the content application 106 to upload the content to the cloud network 102 and/or to save the content locally to the user device 104. The content service 112 may store the uploaded content and any metadata associated with the content in one or more databases 114.

The plurality of computing nodes 118 may process tasks associated with the content service 112. The plurality of computing nodes 118 may be implemented as one or more computing devices, one or more processors, one or more virtual computing instances, a combination thereof, and/or the like. The plurality of computing nodes 118 may be implemented by one or more computing devices. The one or more computing devices may comprise virtualized computing instances. The virtualized computing instances may comprise a virtual machine, such as an emulation of a computer system, operating system, server, and/or the like. A virtual machine may be loaded by a computing device based on a virtual image and/or other data defining specific software (e.g., operating systems, specialized applications, servers) for emulation. Different virtual machines may be loaded and/or terminated on the one or more computing devices as the demand for different types of processing services changes. A hypervisor may be implemented to manage the use of different virtual machines on the same computing device.

In an embodiment, the content service 112 comprises a neural network 110. The neural network 110 may be, for example, a convolutional neural network. The neural network 110 may be utilized, at least in part, to predict face shape and/or expression activation. As discussed above, traditional two-dimensional landmark data does not naturally work with neural networks, such as convolutional neural networks. As a result, the neural network 110 may not be able to predict face shape and/or expression activation using two-dimensional facial landmarks as input.

Instead, the neural network 110 may receive image-based representations of two-dimensional facial landmarks as input during the training stage. Once trained, the neural network 110 may be able to more accurately predict a facial expression associated with a subsequently received image comprising a face during the application stage. For example, the trained neural network 110 may be able to predict a facial expression associated with a subsequently received image comprising a face so that this information may be utilized to control an animation. The animation may be controlled so that its facial expressions are the same as or similar to the facial expressions predicted by the trained neural network 110.

In an embodiment, the neural network 110 may receive the original image corresponding to the two-dimensional landmarks as input during the training stage. For example, the neural network 110 may receive both an image-based representation of the two-dimensional facial landmarks and the original image corresponding to the two-dimensional landmark as input during the training stage. The original image corresponding to the two-dimensional landmarks may be, for example, a RGB image corresponding to the two-dimensional landmarks. The original image corresponding to the two-dimensional landmarks may be a cropped image. The original image corresponding to the two-dimensional landmarks may be of any resolution, such as a 256×256 resolution. If both the original image corresponding to the two-dimensional landmarks and the image-based representation of the two-dimensional facial landmarks are input into the neural network 110 for training, the original image corresponding to the two-dimensional landmarks and the image-based representation of the two-dimensional facial landmarks may be of the same resolution.

In an embodiment, the image-based representations of two-dimensional facial landmarks are segmentation maps. A segmentation map may depict various segments of a face. Each segment may correspond to a particular facial region. For example, each segment may correspond to one of a left eye, a right eye, a left pupil, a right pupil, a left eyebrow, a right eyebrow, a nose, an upper lip, a lower lip, or a remaining portion of the at least one part of the face (e.g. the rest of the face). Each segment depicted by the segmentation map may be a different color/shade so that the segment boundaries are clearly delineated.

In an embodiment, the content service 112 comprises a segmentation model 111. The segmentation model 111 may be configured to generate the image-based representations of two-dimensional facial landmarks, such as the segmentation maps. To generate the image-based representations of two-dimensional facial landmarks, the segmentation model 111 may receive, as input, two-dimensional facial landmark data associated with an image depicting a face (or part of a face).

The two-dimensional facial landmark data may have already been generated, such as by the content provider 102 or by another entity or party. The two-dimensional facial landmark data may indicate a plurality of numbers and a position associated with each number. Each number may correspond to a single facial landmark. For example, the position associated with each number selected from the plurality of numbers may comprise a set of coordinates on the image of the face (or part of the face). The two-dimensional facial landmark data may indicate any quantity of facial landmarks, such as one hundred or any other number of facial landmarks associated with the image of the face (or part of the face).

The segmentation model 111 may generate a triangulation based on the received two-dimensional facial landmark data. Triangulation is the process of determining the location of a point by forming triangles to the point from known points. To generate the triangulation, the segmentation model 111 may connect the plurality of numbers (in their respective positions) with each other to form a plurality of triangles. The generated triangulation may depict the plurality of numbers (in their respective positions) connected to one another to form the plurality of triangles.

In an embodiment, the segmentation model 111 may connect the same numbers together to form the plurality of triangles each time the segmentation model 111 is generating a new image-based representation of the two-dimensional facial landmarks. For example, numbers 1-9, each representative of a facial landmark, may always represent a particular facial region (e.g. an eyebrow or any other region) regardless of position, so the segmentation model 111 may always connect the numbers 1-9 together to form triangles. The exact size/shape of the formed triangles may vary depending in the position of the numbers 1-9. For example, the exact size/shape of the formed triangles may vary depending on the size or shape of the eyebrow in the original image.

The segmentation model 111 may group the triangles of the plurality of triangles into various functional units. Each functional unit may be given a label indicating a facial region associated with the triangles belonging to the unit. For example, the triangles may each be assigned to one of the following functional units: left eye, a right eye, a left pupil, a right pupil, a left eyebrow, a right eyebrow, a nose, an upper lip, a lower lip, or a remaining portion of the at least one part of the face (e.g. the rest of the face).

The segmentation model 111 may rasterize the triangles with their corresponding labels to form the image-based representation of the two-dimensional facial landmarks (e.g. the segmentation map). Rasterization is the task of taking an image described in a vector graphics format (shapes) and converting it into a raster image (a series of pixels, dots or lines, which, when displayed together, create the image which was represented via shapes). The rasterized image may then be displayed on a computer display, video display or printer, or stored in a bitmap file format. Each functional unit (e.g. segment) in the final image-based representation of the two-dimensional facial landmarks (e.g. the segmentation map) may be depicted in a different color/shade so that the segment boundaries are clearly delineated.

In an embodiment, the neural network 110 may receive, for each frame in a video, both an image-based representation of the two-dimensional facial landmarks and the original image corresponding to the two-dimensional landmarks as input during the training stage. For example, a video may feature a face (or part of a face) moving or making various different expressions. The video may comprise a plurality of frames. For each of the frames, an image-based representation of the two-dimensional facial landmarks corresponding to the frame as well as the original frame image itself (or a cropped version of the original frame) may be input into the neural network 110 to train the neural network 110.

The trained neural network 110 may be able to predict one or more facial expression associated with a subsequently received video comprising a plurality of frames (e.g. images). For example, the trained neural network 110 may receive, as input, a video comprising a plurality of frames. The video may be, for example, content 116. The trained neural network 110 may predict facial movement and/or expressions being made in the video so that this information may be utilized to control an animation. The animation may be controlled so that its movement and/or facial expressions are the same as or similar to the facial expressions predicted by the trained neural network 110.

The content service 112 may utilize the trained neural network 110 to predict facial movement and/or expressions in content (e.g. images, videos) uploaded to the content service 112 by client devices 104a-d. For example, the content service 112 may receive a video featuring a user's face (or part of a face) from a client device 104a-d. The content service 112 may utilize the trained neural network 110 to predict how the user's face is moving and/or what facial expressions the user is making. The content service 112 may utilize this prediction in a variety of different ways. For example, the content service 112 may utilize this prediction to generate an animation (e.g. animated character, animated emoji, etc.) that resembles the user and/or the user's facial expressions.

Figure 2:
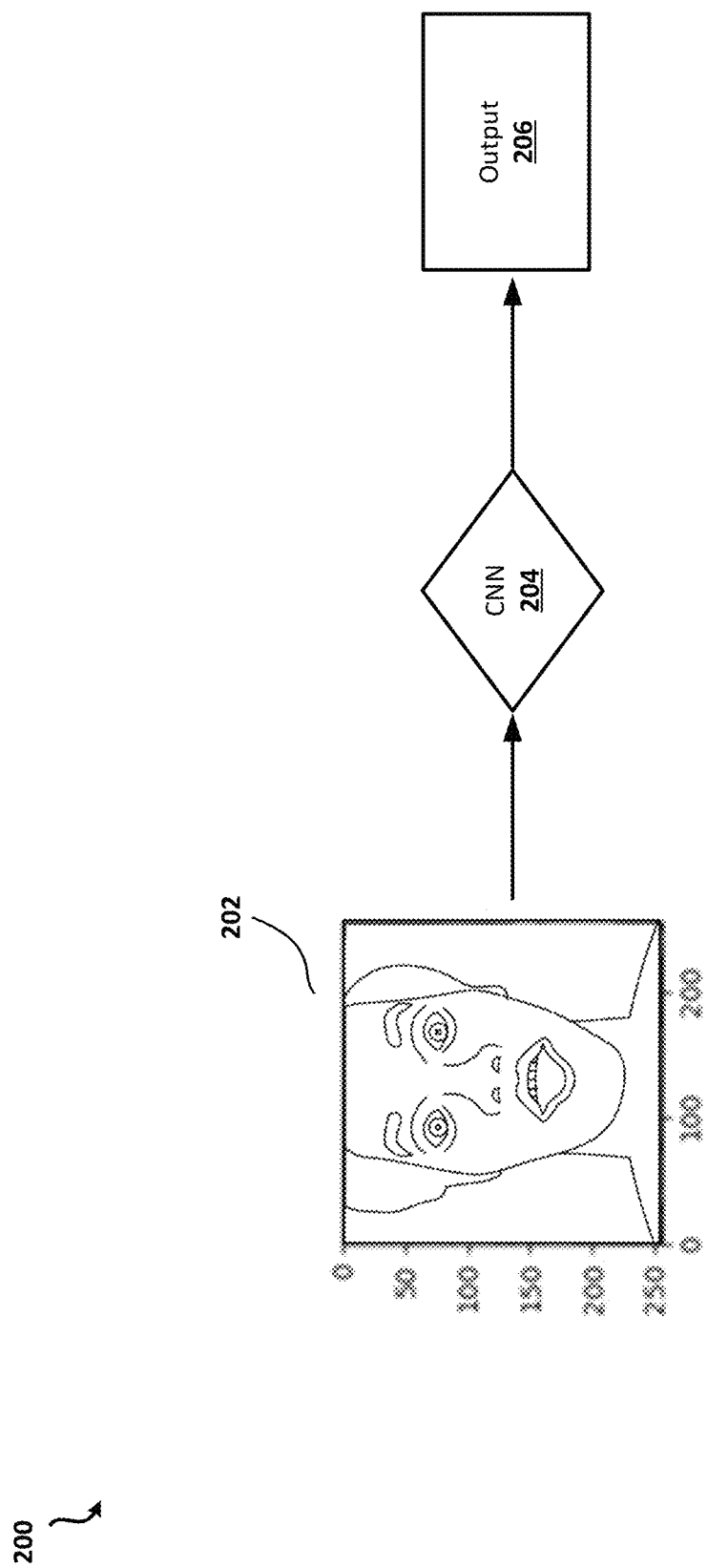
FIG. 2 shows an example existing system for face tracking.

As discussed above, traditional two-dimensional landmark data does not naturally work with neural networks, such as convolutional neural networks. As a result, the neural network 110 may not be able to predict face shape and/or expression activation using two-dimensional facial landmarks as input. FIG. 2 illustrates an example system 200 for face tracking. The system 200 utilizes a neural network 204 that is not able to predict face shape and/or expression activation using two-dimensional facial landmarks as input. Rather, the neural network 204 may receive as input only an image 202. The neural network 204 may receive the image 202 and to attempt to predict facial expressions associated with the image. The prediction may be the output 206 of the neural network 204. The output 206 of the system 200 may not be as accurate as the output of a neural network, such as the neural network 110 described above, that is able to utilize two-dimensional facial landmarks to predict face shape and/or expression activation. Accordingly, a neural network that is able to utilize two-dimensional facial landmarks to predict face shape and/or expression activation is preferred.

Figure 3:
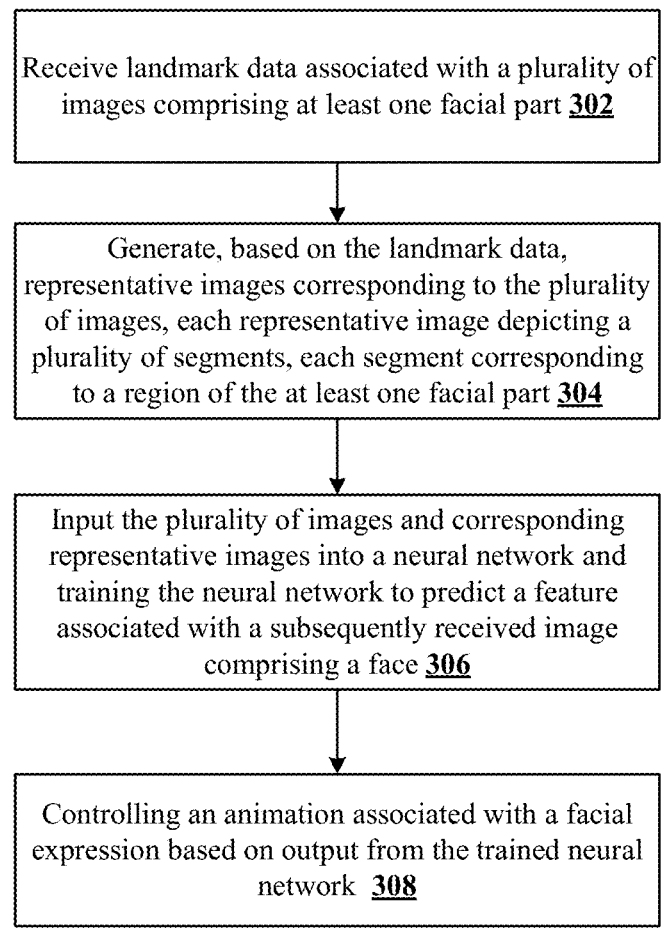
FIG. 3 shows an example method for face tracking.

FIG. 3 illustrates an example process 300 performed by a segmentation model (e.g. segmentation model 111). The segmentation model may perform the process 300 to train a neural network to predict facial expressions using two-dimensional landmark data. Although depicted as a sequence of operations in FIG. 3, those of ordinary skill in the art will appreciate that various embodiments may add, remove, reorder, or modify the depicted operations.

By transforming two-dimensional facial landmark data associated with an image of a face (or part of a face) into an image-based representation of the landmark data and inputting the image-based representation into a neural network to train the neural network, the neural network may effectively be able to utilize two-dimensional facial landmark data to perform face tracking and expression recognition. As a result, the quality of face tracking and expression recognition may be improved.

To transform the two-dimensional facial landmark data associated with an image of a face (or part of a face) into an image-based representation, two-dimensional facial landmark data associated with the image may be received. At 302, the two-dimensional facial landmark data associated with a plurality of images and indicative of at least one facial part may be received. The two-dimensional facial landmark data may have already been generated, such as by the content provider 102 or by another entity or party. The two-dimensional facial landmark data may comprise a plurality of numbers and a position associated with each number. Each number may correspond to a single facial landmark. For example, the position associated with each number selected from the plurality of numbers may comprise a set of coordinates on the image of the face (or part of the face). The two-dimensional facial landmark data may indicate any quantity of facial landmarks, such as one hundred or any other number of facial landmarks associated with the image of the face (or part of the face).

Figure 5:
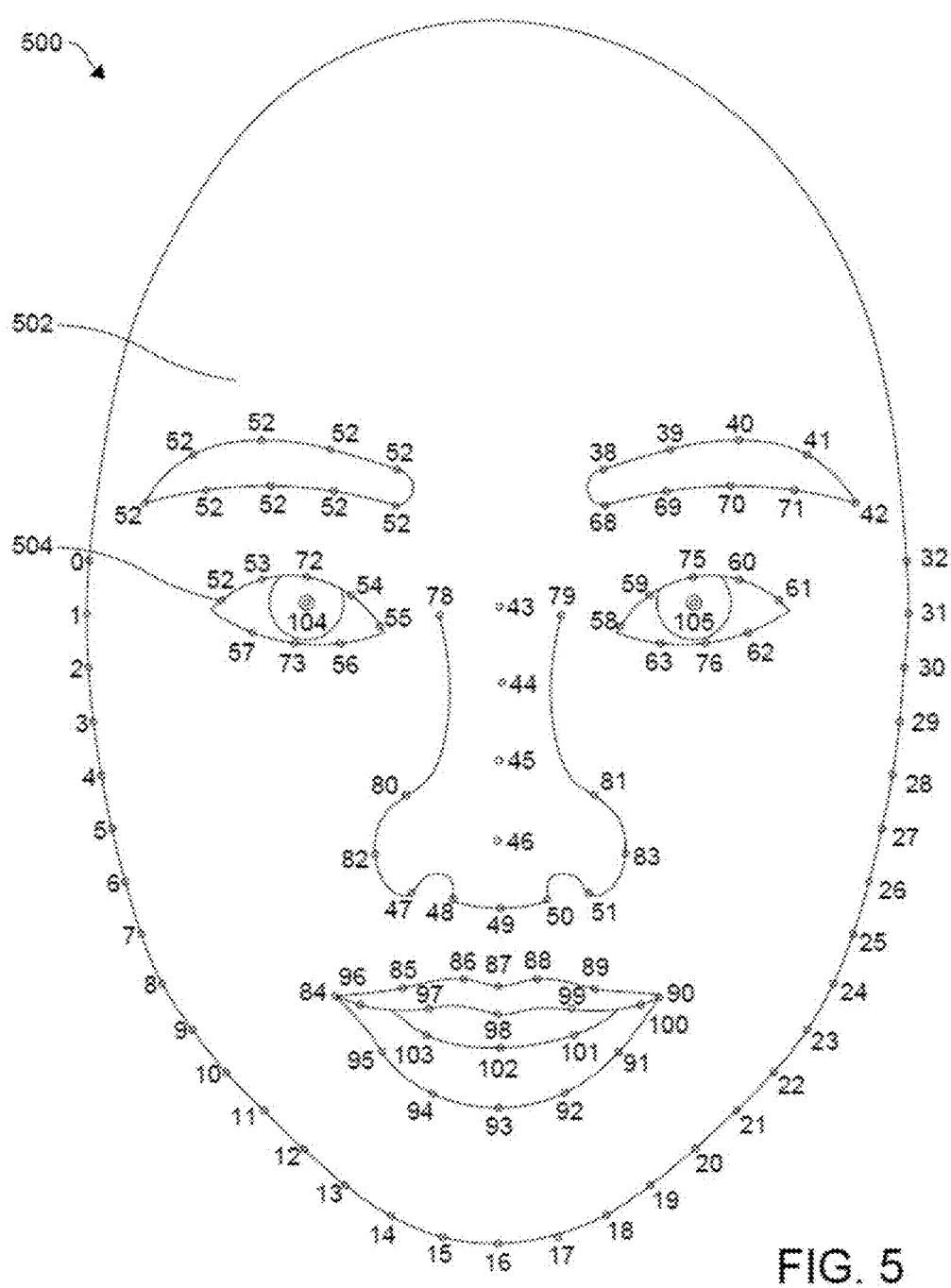
FIG. 5 shows an example image including landmark data.

FIG. 5 illustrates an exemplary set of facial landmarks 500 corresponding to an image of a face 502. Each of the numbers overlaid on the image of the face 502 represent a facial landmark. The set of facial landmarks 500 includes 104 landmarks (0-103), but a set of facial landmarks may comprise any quantity of landmarks. Each of the numbers corresponds to a particular facial region. For example, the landmark 504 (represented by the number 52) corresponds to a right eye of the face 502.

The remainder of the numbers similarly correspond to a particular facial region, such as one of the left eye, a right eye, a left pupil, a right pupil, a left eyebrow, a right eyebrow, a nose, an upper lip, a lower lip, or a remaining portion of the face 502. More than one landmark corresponds to a single facial region. For example, nine of the landmarks in the set of facial landmarks 500 correspond to the right eyebrow and nine other the landmarks in the set of facial landmarks 500 correspond to the left eyebrow. A plurality of landmarks may similarly correspond to each of the left eye, the right eye, the left pupil, the right pupil, the nose, the upper lip, the lower lip, or the remaining portion of the face 502.

Referring back to FIG. 3, at 304, representative images corresponding to the plurality of images may be generated based on the received landmark data. Each representative image may be a segmentation map. A segmentation map may depict various segments of the face (or part of the face) depicting in the at least one image. Each segment may correspond to a particular region of the at least one facial part. For example, each segment may correspond to one of a left eye, a right eye, a left pupil, a right pupil, a left eyebrow, a right eyebrow, a nose, an upper lip, a lower lip, or a remaining portion of the at least one facial part (e.g. the rest of the face). Each segment depicted by the segmentation map may be a different color/shade so that the segment boundaries are clearly delineated. A technique 400 for generating the image-based representation of the received landmark data is described below in more detail with regard to FIG. 4.

Figure 6:
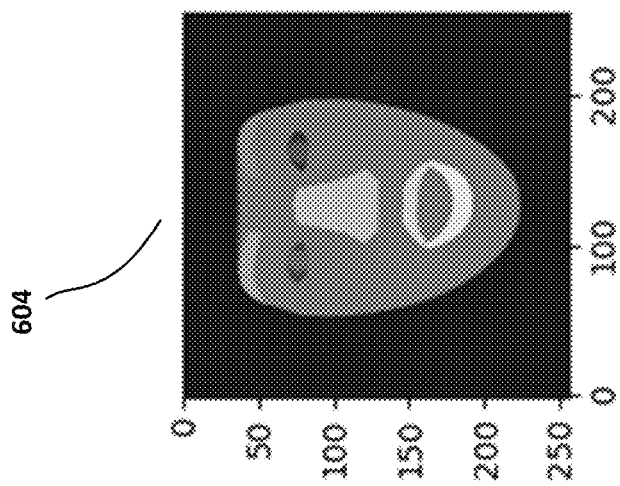
FIG. 6 shows an example segmentation map.
Figure 6:
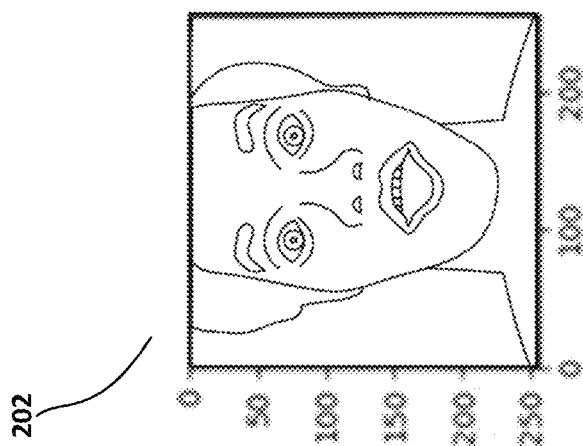

FIG. 6 illustrates an exemplary image-based representation 604 of the landmark data corresponding to an image 202 of a face. The image-based representation 604 is divided into various segments. For example, the image-based representation 604 is divided into a left eye, a right eye, a left pupil, a right pupil, a left eyebrow, a right eyebrow, a nose, an upper lip, a lower lip, or a remaining portion of the at least one part of the face (e.g. the rest of the face). Each segment depicted by the image-based representation 604 is a different shade of grey so that the segment boundaries are clearly delineated. For example, the boundary between the nose and the rest of the face is clearly delineated because the nose is a lighter shade of grey than the rest of the face.

Referring back to FIG. 3, at 306, the plurality of images comprising at least one facial part and corresponding representative images may be input into a neural network (e.g. neural network 110) to train the neural network to predict a feature associated with a subsequently received image comprising a face (or part of a face). The trained neural network may be able to predict one or more facial expression associated with a subsequently received image or video comprising a plurality of frames (e.g. images). For example, the trained neural network may receive, as input, an image (such a video frame). The trained neural network may predict facial movement and/or expressions being made in the image or video so that this information may be utilized to control an animation. The animation may be controlled so that its movement and/or facial expressions are the same as or similar to the facial expressions predicted by the trained neural network. At 308, an animation associated with a facial expression may be controlled based on output from the trained neural network.

Figure 4:
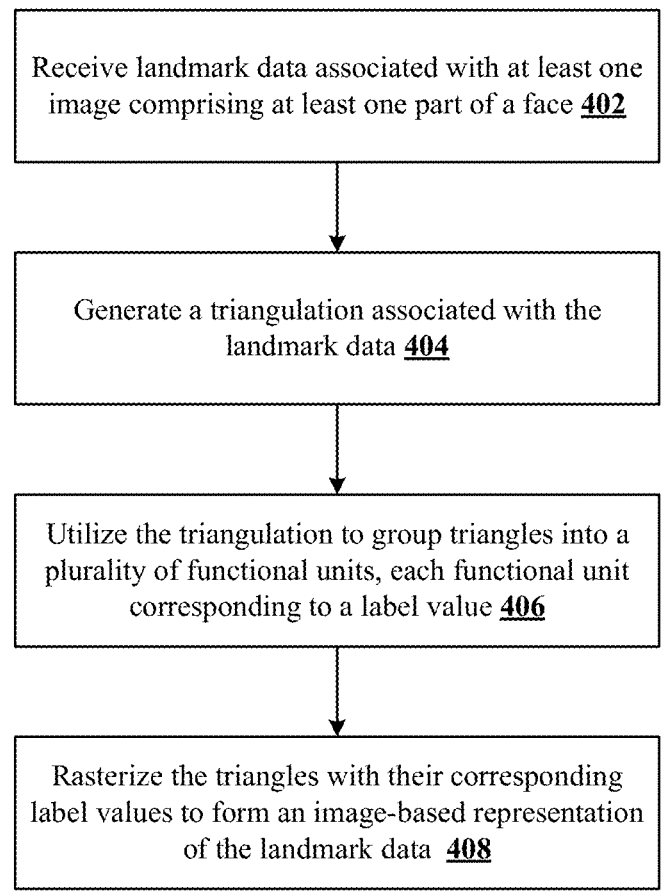
FIG. 4 shows another example method for face tracking.

FIG. 4 illustrates an example process 400 performed by a segmentation model (e.g. segmentation model 111). The segmentation model may perform the process 400 to generate an image-based representation of landmark data. For example, the segmentation model may perform the process 400 to generate an image-based representation of landmark data for training a neural network to predict facial expressions. Although depicted as a sequence of operations in FIG. 4, those of ordinary skill in the art will appreciate that various embodiments may add, remove, reorder, or modify the depicted operations.

By transforming two-dimensional facial landmark data associated with an image of a face (or part of a face) into an image-based representation of the landmark data and inputting the image-based representation into a neural network to train the neural network, the neural network may effectively be able to utilize two-dimensional facial landmark data to perform face tracking and expression recognition. As a result, the quality of face tracking and expression recognition may be improved.

To transform the two-dimensional facial landmark data associated with an image of a face (or part of a face) into an image-based representation, two-dimensional facial landmark data associated with the image may be received. At 402, the two-dimensional facial landmark data associated with the image and indicative of at least one facial part may be received. The two-dimensional facial landmark data may have already been generated, such as by the content provider 102 or by another entity or party. The two-dimensional facial landmark data may indicate a plurality of numbers and a position associated with each number. Each number may correspond to a single facial landmark. For example, the position associated with each number selected from the plurality of numbers may comprise a set of coordinates on the image of the face (or part of the face). The two-dimensional facial landmark data may indicate any quantity of facial landmarks, such as one hundred or any other number of facial landmarks associated with the image of the face (or part of the face). As discussed above, FIG. 5 illustrates an exemplary set of facial landmarks 500 corresponding to an image of a face 502.

At 404, a triangulation may be generated based on the received two-dimensional facial landmark data. As discussed above, triangulation is the process of determining the location of a point by forming triangles to the point from known points. To generate the triangulation, the plurality of numbers (in their respective positions) may be connected with each other to form a plurality of triangles. For example, the generated triangulation may depict the plurality of numbers (in their respective positions) connected to one another to form the plurality of triangles.

In an embodiment, the same numbers together may be connected to form the plurality of triangles each time a new image-based representation of two-dimensional facial landmarks is generated. For example, numbers 1-9, each representative of a facial landmark, may always represent a particular facial region (e.g. an eyebrow or any other region) regardless of position, so the numbers 1-9 may always be connected together to form triangles. The exact size/shape of the formed triangles may vary depending in the position of the numbers 1-9. For example, the exact size/shape of the formed triangles may vary depending on the size or shape of the eyebrow in the original image.

At 406, the plurality of triangles may be grouped (e.g. segmented) into various functional units (e.g. segments). Each functional unit may be given a label indicating a facial region associated with the triangles belonging to the unit. For example, the triangles may each be assigned to one of the following functional units: a left eye, a right eye, a left pupil, a right pupil, a left eyebrow, a right eyebrow, a nose, an upper lip, a lower lip, or a remaining portion of the at least one part of the face (e.g. the rest of the face).

At 408, the triangles may be rasterized with their corresponding labels to form the image-based representation of the two-dimensional facial landmarks (e.g. the segmentation map). As discussed above, rasterization is the task of taking an image described in a vector graphics format (shapes) and converting it into a raster image (a series of pixels, dots or lines, which, when displayed together, create the image which was represented via shapes). The rasterized image may then be displayed on a computer display, video display or printer, or stored in a bitmap file format. Each functional unit (e.g. segment) in the final image-based representation of the two-dimensional facial landmarks (e.g. the segmentation map) may be depicted in a different color/shade so that the segment boundaries are clearly delineated.

Figure 7:
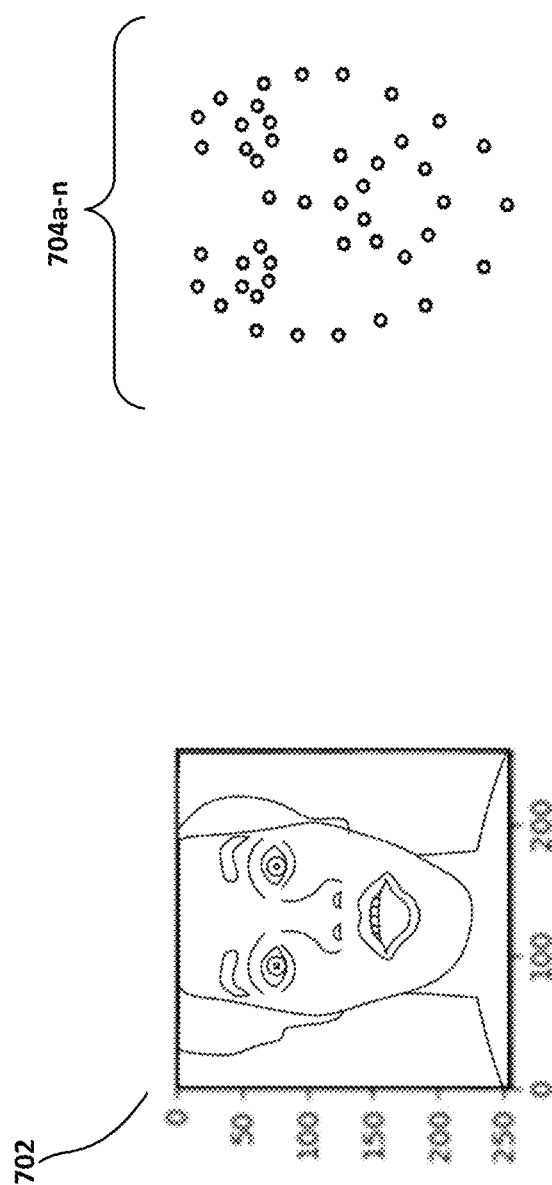
FIG. 7 shows example landmark data associated with an image of a face.
Figure 8:
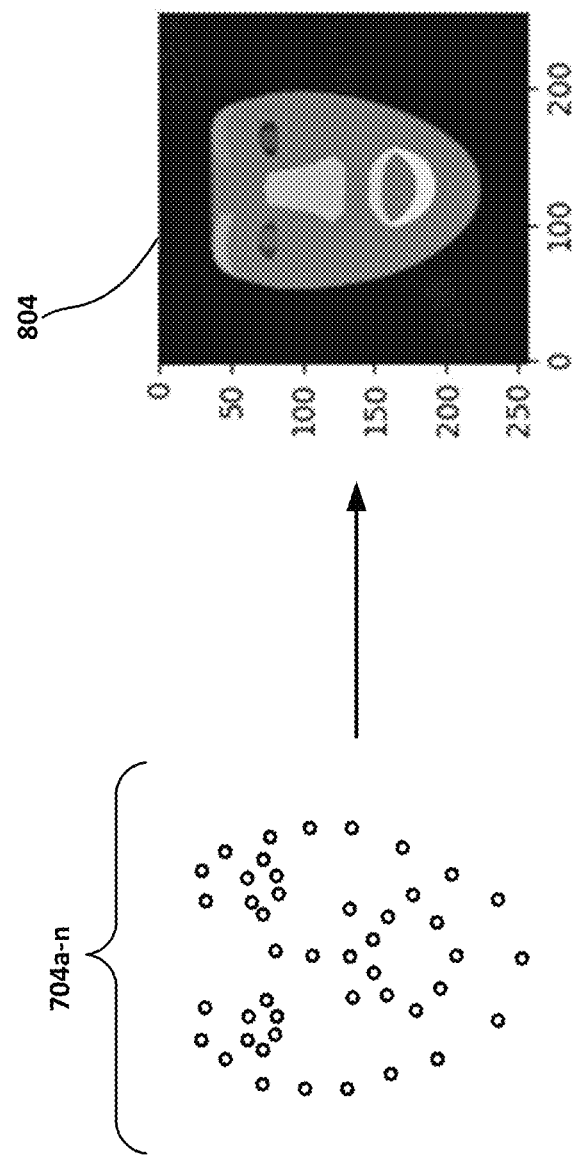
FIG. 8 shows an example segmentation map associated with landmark data.

FIGS. 7-8 depict various steps in a process for generating an image-based representation of two-dimensional facial landmarks. As discussed above, to generate an image-based representation of two-dimensional facial landmarks, a segmentation model (e.g. segmentation model 111) may receive, as input, two-dimensional facial landmark data associated with an image depicting a face (or part of a face). FIG. 7 shows landmark data 704*a-n* being extracted from an image 702 of a face. Each of the dots 704*a-n* represents a particular facial landmark. Each dot 704*a-n* may be associated with a particular number of a plurality of numbers and a position on the image 702. Each number may correspond to a single facial landmark. For example, the position associated with each number selected from the plurality of numbers may comprise a set of coordinates on the image 702. The set of coordinates may indicate a horizontal position on the x-axis (horizontal axis below image 702) and a vertical position on the y-axis (vertical axis to the left of image 702). The two-dimensional facial landmark data may indicate any quantity of facial landmarks, such as one hundred or any other number of facial landmarks associated with the image of the face (or part of the face).

A triangulation may be generated based on the received two-dimensional facial landmark data 704*a-n*. FIG. 8 shows landmark data 704*a-n* being transformed into an image-based representation 804 (e.g. a segmentation map) of the landmark data 704*a-n*. As discussed above, triangulation is the process of determining the location of a point by forming triangles to the point from known points. To generate the triangulation, the plurality of numbers (in their respective positions) may be connected with each other to form a plurality of triangles. For example, the generated triangulation may depict the plurality of numbers (in their respective positions) connected to one another to form the plurality of triangles.

In an embodiment, the same numbers together may be connected to form the plurality of triangles each time a new image-based representation of two-dimensional facial landmarks is generated. For example, numbers 1-9, each representative of a facial landmark, may always represent a particular facial region (e.g. an eyebrow or any other region) regardless of position, so the numbers 1-9 may always be connected together to form triangles. The exact size/shape of the formed triangles may vary depending in the position of the numbers 1-9. For example, the exact size/shape of the formed triangles may vary depending on the size or shape of the eyebrow in the original image.

The plurality of triangles may be grouped (e.g. segmented) into various functional units (e.g. segments). Each functional unit may be given a label indicating a facial region associated with the triangles belonging to the unit. For example, the triangles may each be assigned to one of the following functional units: a left eye, a right eye, a left pupil, a right pupil, a left eyebrow, a right eyebrow, a nose, an upper lip, a lower lip, or a remaining portion of the at least one part of the face (e.g. the rest of the face).

The triangles may be rasterized with their corresponding labels to form the image-based representation 804 of the two-dimensional facial landmarks 704*a-n*. As discussed above, rasterization is the task of taking an image described in a vector graphics format (shapes) and converting it into a raster image (a series of pixels, dots or lines, which, when displayed together, create the image which was represented via shapes). The rasterized image may then be displayed on a computer display, video display or printer, or stored in a bitmap file format. Each functional unit (e.g. segment) in the final image-based representation 804 of the two-dimensional facial landmarks 704*a-n* may be depicted in a different color/shade so that the segment boundaries are clearly delineated.

Figure 9:
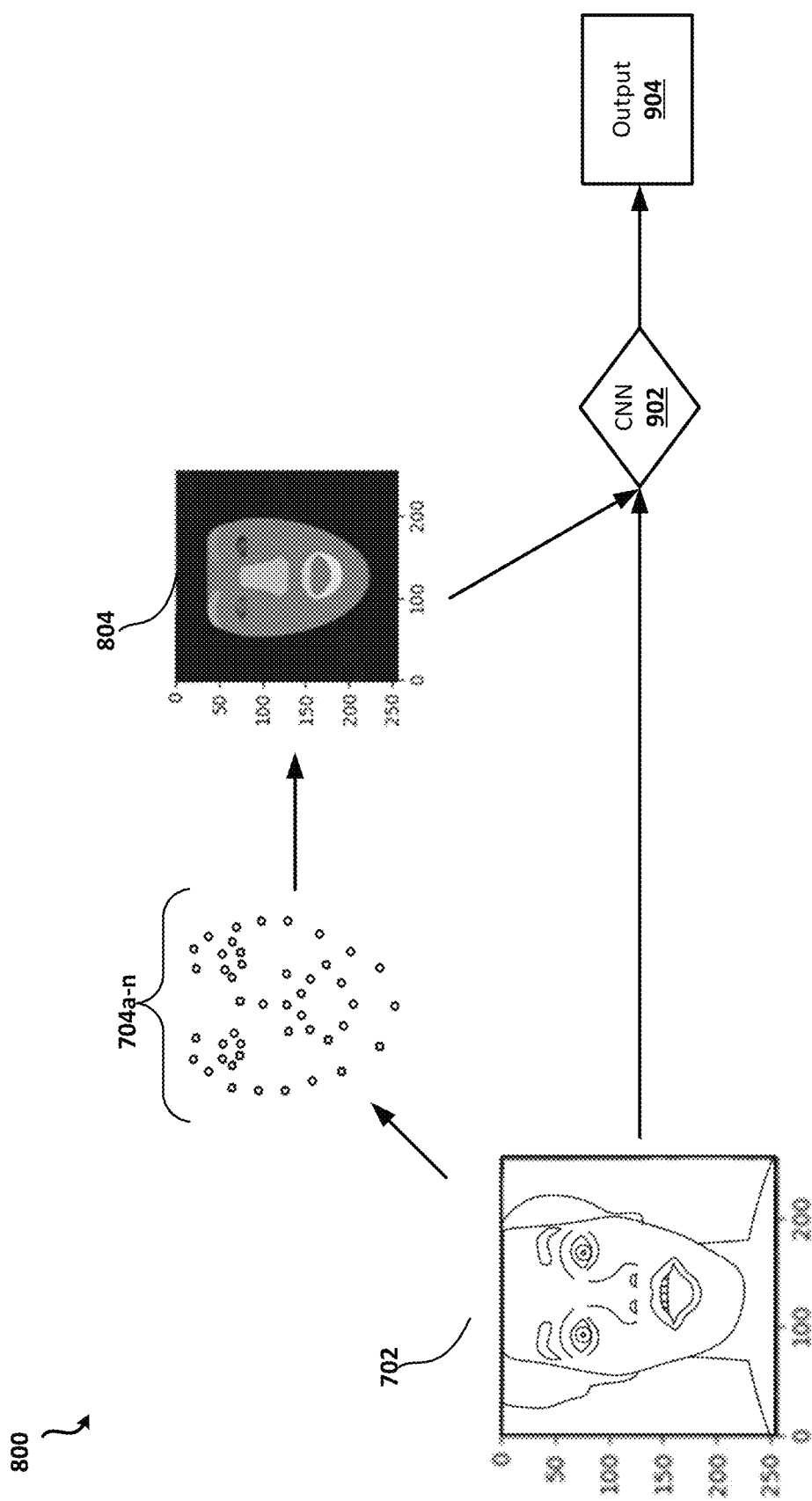
FIG. 9 shows an example system for face tracking.

FIG. 9 shows a system for training a neural network (e.g. neural network 110) to predict face shape and/or expression activation using two-dimensional facial landmarks. By transforming two-dimensional facial landmark data associated with an image of a face into an image-based representation of the landmark data and inputting the image-based representation into a neural network to train the neural network, the neural network may effectively be able to utilize two-dimensional facial landmark data to perform face tracking and expression recognition. As a result, the quality of face tracking and expression recognition may be improved.

As discussed above with respect to FIGS. 7-8, landmark data 704*a-n* may be extracted from an image 702 of a face. The landmark data 704*a-n* may be transformed into an image-based representation 804 (e.g. a segmentation map) of the landmark data 704*a-n*. To train a neural network to predict face shape and/or expression activation using two-dimensional facial landmarks, the image-based representation 804 and the image 702 may both be fed into a neural network 902 (e.g. a convolutional neural network) to train the neural network 902. The trained neural network 902 may predict expressions being made in subsequently received image(s). For example, the trained neural network 902 may predict expressions being made in subsequently received image(s) so that this information may be utilized to control an animation. The animation may be controlled so that its facial expressions are the same as or similar to the facial expressions predicted by the trained neural network 902.

In an embodiment, the neural network 902 may receive, for each frame in a video, both an image-based representation of the two-dimensional facial landmarks and the original image corresponding to the two-dimensional landmarks as input during the training stage. For example, a video may feature a face (or part of a face) moving or making various different expressions. The video may comprise a plurality of frames. For each of the frames, an image-based representation of the two-dimensional facial landmarks corresponding to the frame as well as the original frame image itself (or a cropped version of the original frame) may be input into the neural network 902 to train the neural network 902.

The trained neural network 902 may be able to predict one or more facial expression associated with a subsequently received video comprising a plurality of frames (e.g. images). For example, the trained neural network 902 may receive, as input, a video comprising a plurality of frames. The trained neural network 902 may utilize to input to generate the output 904. The output 904 may indicate a predicted facial movement and/or expressions being made in the video so that this information may be utilized to control an animation. The animation may be controlled so that its movement and/or facial expressions are the same as or similar to the facial expressions predicted by the trained neural network 902.

Figure 10:
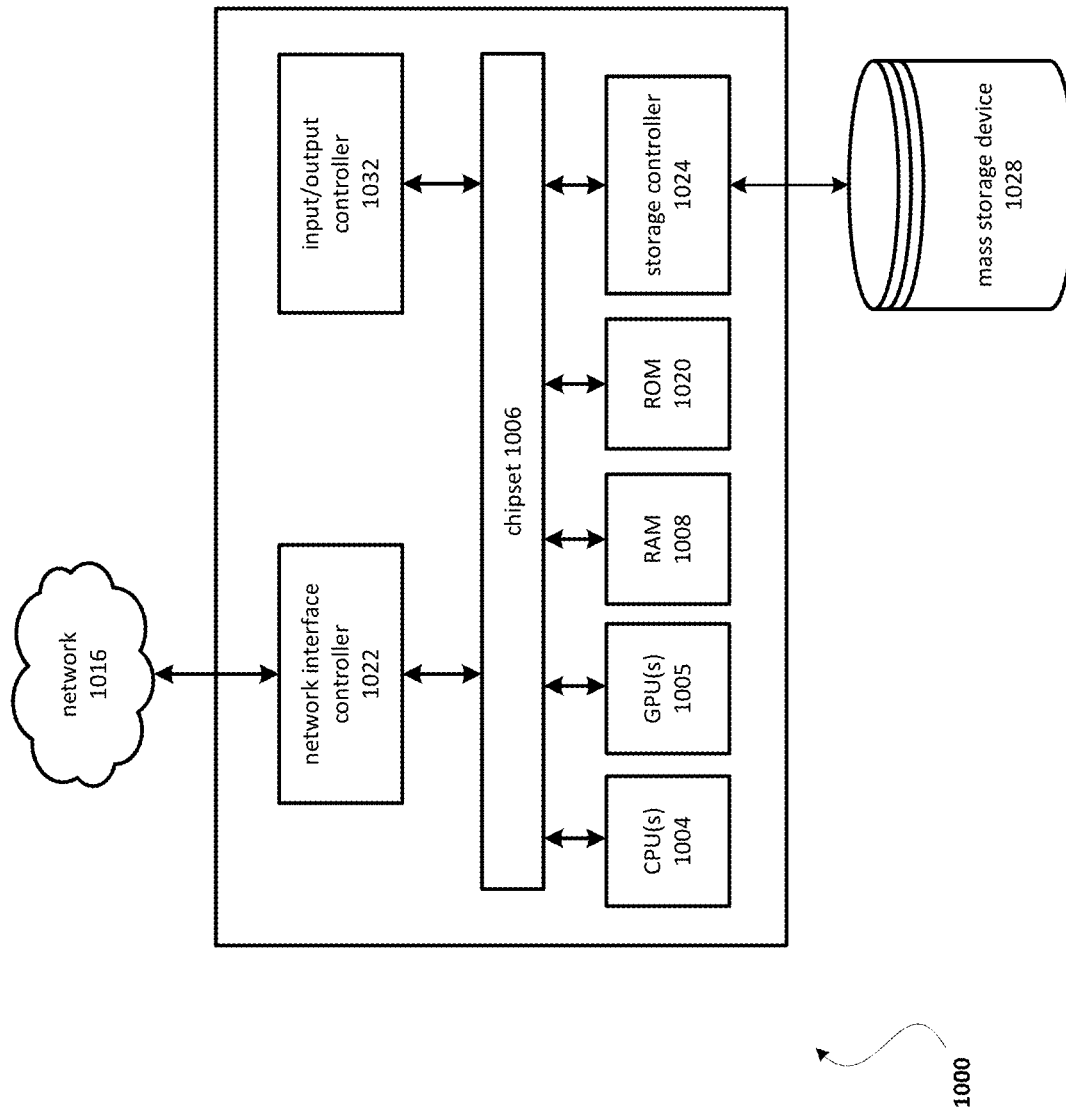
FIG. 10 shows an example computing device which may be used to perform any of the techniques disclosed herein.

FIG. 10 illustrates a computing device that may be used in various aspects, such as the services, networks, modules, and/or devices depicted in FIG. 1. With regard to the example architecture of FIG. 1, the cloud network 102, client devices 104*a*-*d*, network 120, content service 112, and/or database 114 may each be implemented by one or more instance of a computing device 1000 of FIG. 10. The computer architecture shown in FIG. 10 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 1000 may include a baseboard, or "motherboard," which is a printed circuit board to which a multitude of components or devices may be connected by way of a system bus or other electrical communication paths. One or more central processing units (CPUs) 1004 may operate in conjunction with a chipset 1006. The CPU(s) 1004 may be standard programmable processors that perform arithmetic and logical operations necessary for the operation of the computing device 1000.

The CPU(s) 1004 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1004 may be augmented with or replaced by other processing units, such as GPU(s) 1005. The GPU(s) 1005 may comprise processing units specialized for but not necessarily limited to highly parallel computations, such as graphics and other visualization-related processing.

A chipset 1006 may provide an interface between the CPU(s) 1004 and the remainder of the components and devices on the baseboard. The chipset 1006 may provide an interface to a random-access memory (RAM) 1008 used as the main memory in the computing device 1000. The chipset 1006 may further provide an interface to a computer-readable storage medium, such as a read-only memory (ROM) 1020 or non-volatile RAM (NVRAM) (not shown), for storing basic routines that may help to start up the computing device 1000 and to transfer information between the various components and devices. ROM 1020 or NVRAM may also store other software components necessary for the operation of the computing device 1000 in accordance with the aspects described herein.

The computing device 1000 may operate in a networked environment using logical connections to remote computing nodes and computer systems through local area network (LAN). The chipset 1006 may include functionality for providing network connectivity through a network interface controller (NIC) 1022, such as a gigabit Ethernet adapter. A NIC 1022 may be capable of connecting the computing device 1000 to other computing nodes over a network 1016. It should be appreciated that multiple NICs 1022 may be present in the computing device 1000, connecting the computing device to other types of networks and remote computer systems.

The computing device 1000 may be connected to a mass storage device 1028 that provides non-volatile storage for the computer. The mass storage device 1028 may store system programs, application programs, other program modules, and data, which have been described in greater detail herein. The mass storage device 1028 may be connected to the computing device 1000 through a storage controller 1024 connected to the chipset 1006. The mass storage device 1028 may consist of one or more physical storage units. The mass storage device 1028 may comprise a management component 1210. A storage controller 1024 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1000 may store data on the mass storage device 1028 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1028 is characterized as primary or secondary storage and the like.

For example, the computing device 1000 may store information to the mass storage device 1028 by issuing instructions through a storage controller 1024 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1000 may further read information from the mass storage device 1028 by detecting the physical states or characteristics of one or more particular locations within the physical storage units.

In addition to the mass storage device 1028 described above, the computing device 1000 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1000.

By way of example and not limitation, computer-readable storage media may include volatile and non-volatile, transitory computer-readable storage media and non-transitory computer-readable storage media, and removable and nonremovable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1028 depicted in FIG. 10, may store an operating system utilized to control the operation of the computing device 1000. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1028 may store other system or application programs and data utilized by the computing device 1000.

The mass storage device 1028 or other computer-readable storage media may also be encoded with computer-executable instructions, which, when loaded into the computing device 1000, transforms the computing device from a general-purpose computing system into a special-purpose computer capable of implementing the aspects described herein. These computer-executable instructions transform the computing device 1000 by specifying how the CPU(s) 1004 transition between states, as described above. The computing device 1000 may have access to computer-readable storage media storing computer-executable instructions, which, when executed by the computing device 1000, may perform the methods described herein.

A computing device, such as the computing device 1000 depicted in FIG. 10, may also include an input/output controller 1032 for receiving and processing input from a number of input devices, such as a keyboard, a mouse, a touchpad, a touch screen, an electronic stylus, or other type of input device. Similarly, an input/output controller 1032 may provide output to a display, such as a computer monitor, a flat-panel display, a digital projector, a printer, a plotter, or other type of output device. It will be appreciated that the computing device 1000 may not include all of the components shown in FIG. 10, may include other components that are not explicitly shown in FIG. 10, or may utilize an architecture completely different than that shown in FIG. 10.

As described herein, a computing device may be a physical computing device, such as the computing device 1000 of FIG. 10. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method implemented by a computing system comprising at least one processor, comprising:
    receiving landmark data, wherein the landmark data are associated with a plurality of images and indicative of at least one facial part;
    generating, based on the landmark data, representative images corresponding to the plurality of images, each representative image depicting a plurality of segments, wherein each segment corresponds to a region of the at least one facial part, wherein generating each representative image further comprises:
        rasterizing the plurality of segments with corresponding labels each of which indicates a corresponding region of the at least one facial part, and
        delineating boundaries of the plurality of segments by applying a different color or shade to each of the plurality of segments; and
    inputting the representative images corresponding to the plurality of images into a neural network and training the neural network to predict a feature associated with a subsequently received image comprising a face.

2. The method of claim 1, wherein the neural network is trained using the plurality of images and the representative images corresponding to the plurality of images.

3. The method of claim 1, wherein the training the neural network to predict a feature further comprises training the neural network to predict a facial expression associated with the subsequently received image comprising the face.

4. The method of claim 1, wherein the receiving landmark data further comprises:
    receiving, for each image among the plurality of images, data indicative of a plurality of numbers and a position associated with each number selected from the plurality of numbers, wherein each number selected from the plurality of numbers corresponds to a single landmark.

5. The method of claim 4, wherein the position associated with each number selected from the plurality of numbers comprises a set of coordinates on a corresponding image among the plurality of images.

6. The method of claim 4, further comprising:
generating, based on the data indicative of the plurality of numbers and the position associated with each number selected from the plurality of numbers, a triangulation associated with at least one portion of the landmark data.

7. The method of claim 6, further comprising:
determining, for each representative image, a boundary associated with each segment selected from the plurality of segments based on the triangulation.

8. The method of claim 1, wherein the region of the at least one facial part comprises one of a left eye, a right eye, a left pupil, a right pupil, a left eyebrow, a right eyebrow, a nose, an upper lip, a lower lip, or a remaining portion of the at least one facial part.

9. The method of claim 1, further comprising:
controlling an animation associated with a facial expression based on output from the trained neural network.

10. A system, comprising:
at least one processor in communication with at least one memory, the at least one memory comprising computer-readable instructions that upon execution by the at least one processor cause the system to perform operations comprising:
receiving landmark data, wherein the landmark data are associated with a plurality of images and indicative of at least one facial part;
generating, based on the landmark data, representative images corresponding to the plurality of images, each representative image depicting a plurality of segments, wherein each segment corresponds to a region of the at least one facial part, wherein generating each representative image further comprises:
rasterizing the plurality of segments with corresponding labels each of which indicates a corresponding region of the at least one facial part, and
delineating boundaries of the plurality of segments by applying a different color or shade to each of the plurality of segments; and
inputting the representative images corresponding to the plurality of images into a neural network and training the neural network to predict a feature associated with a subsequently received image comprising a face.

11. The system of claim 10, wherein the neural network is trained using the plurality of images and the representative images corresponding to the plurality of images.

12. The system of claim 10, wherein the training the neural network to predict a feature further comprises training the neural network to predict a facial expression associated with the subsequently received image comprising the face.

13. The system of claim 10, wherein the receiving landmark data further comprises:
receiving, for each image among the plurality of images, data indicative of a plurality of numbers and a position associated with each number selected from the plurality of numbers, wherein each number selected from the plurality of numbers corresponds to a single landmark.

14. The system of claim 13, wherein the position associated each number selected from the plurality of numbers comprises a set of coordinates on a corresponding image among the plurality of images.

15. The system of claim 13, the operations further comprising:
generating, based on the data indicative of the plurality of numbers and the position associated with each number selected from the plurality of numbers, a triangulation associated with at least one portion of the landmark data; and
determining, for each representative image, a boundary associated with each segment selected from the plurality of segments based on the triangulation.

16. The system of claim 10, further comprising:
controlling an amination associated with a facial expression based on output from the trained neural network.

17. A non-transitory computer-readable storage medium, storing computer-readable instructions that upon execution by a processor cause the processor to implement operations comprising:
receiving landmark data, wherein the landmark data are associated with a plurality of images and indicative of at least one facial part;
generating, based on the landmark data, representative images corresponding to the plurality of images, each representative image depicting a plurality of segments, wherein each segment corresponds to a region of the at least one facial part, wherein generating each representative image further comprises:
rasterizing the plurality of segments with corresponding labels each of which indicates a corresponding region of the at least one facial part, and
delineating boundaries of the plurality of segments by applying a different color or shade to each of the plurality of segments; and
inputting the representative images corresponding to the plurality of images into a neural network and training the neural network to predict a feature associated with a subsequently received image comprising a face.

18. The non-transitory computer-readable storage medium of claim 17, wherein the neural network is trained using the plurality of images and the representative images corresponding to the plurality of images.

19. The non-transitory computer-readable storage medium of claim 17, the operations further comprising:
receiving, for each image among the plurality of images, data indicative of a plurality of numbers and a position associated with each number selected from the plurality of numbers, wherein each number selected from the plurality of numbers corresponds to a single landmark;
generating, based on the data indicative of the plurality of numbers and the position associated with each number selected from the plurality of numbers, a triangulation associated with at least one portion of the landmark data; and
determining, for each representative image, a boundary associated with each segment selected from the plurality of segments based on the triangulation.

* * * * *